United States Patent Office

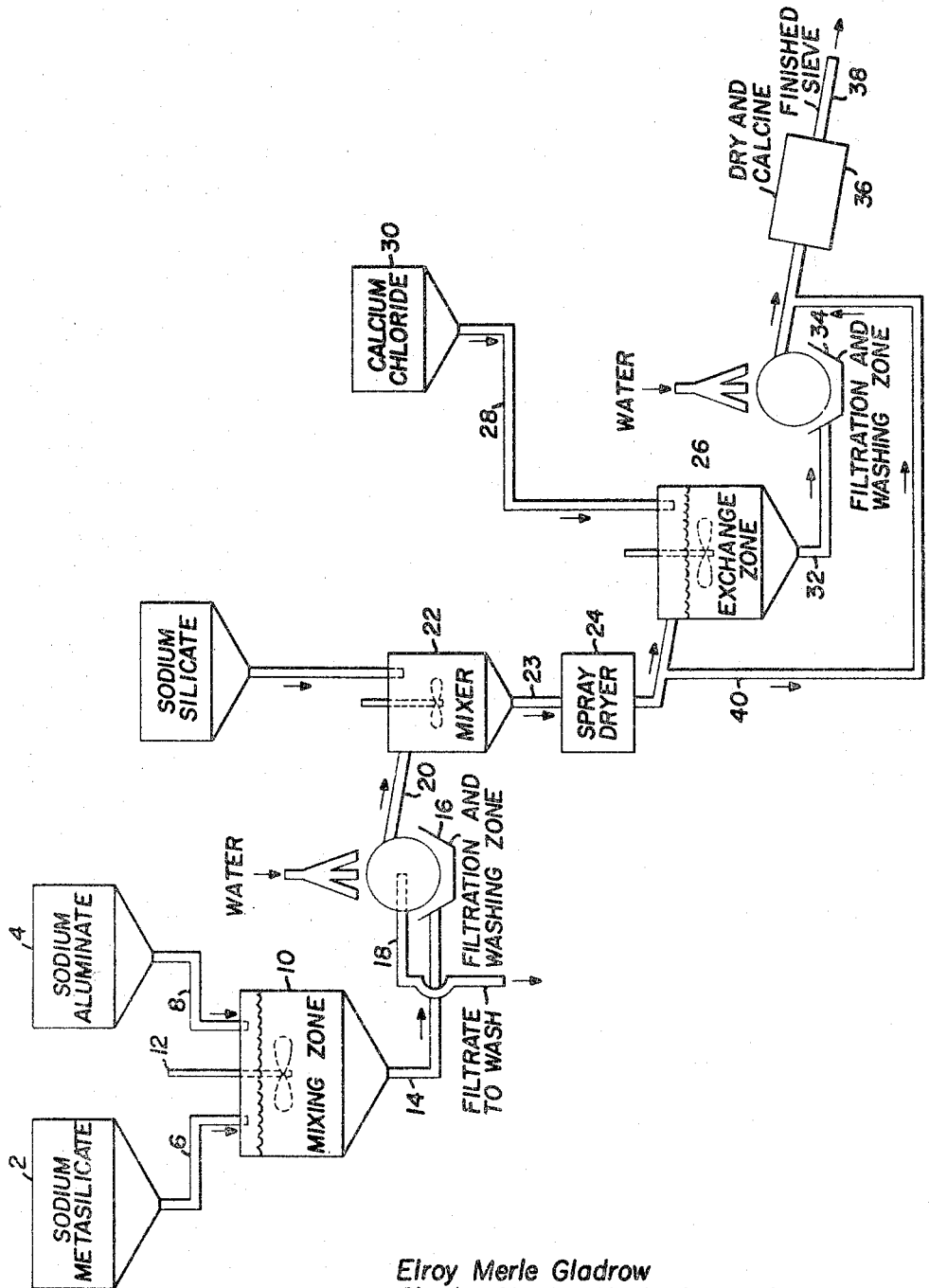

3,055,841
Patented Sept. 25, 1962

3,055,841
PROCESS FOR PREPARING ATTRITION
RESISTANT ADSORBENTS
Elroy Merle Gladrow, Edward Vincent Ruhnke, and
Charles Newton Kimberlin, Jr., Baton Rouge, La., assignors to Esso Research and Engineering Company, a
corporation of Delaware
Filed June 29, 1956, Ser. No. 594,858
6 Claims. (Cl. 252—455)

The present invention relates to the synthesis and manufacture of selective adsorbents adapted to be employed in the separation of molecular types, and in particular to the separation of branch chain from straight chain paraffins and olefinic hydrocarbons. More particularly, the present invention relates to the preparation of compositions having so-called "molecular sieve" properties that are substantially more attrition-resistant and harder than have been prepared before, and that are adapted to be used in moving bed and fluidized bed operations.

It has been known for some time that certain natural zeolites, such as chabasites and analcite and the like have the property of selectively adsorbing normal hydrocarbons and rejecting the branch chain isomers. These zeolites have crystal patterns forming structures containing a large number of small cavities interconnected with a number of still smaller holes or pores. These pores are of exceptional uniformity of size and diameter. Only molecules small enough to enter the pores can be adsorbed. The pores may vary from less than 3 to more than 15 Angstrom units in diameter, but for any one zeolite the pores are of substantially uniform size.

The patent and scientific literature contains numerous references to the adsorbing action of natural and synthetic zeolites. Thus synthetic zeolites have been described, for instance, by Barrer (U.S. 2,306,610) and Black (U.S. 2,442,191). Zeolites, both natural and synthetic, vary considerably in composition, but most generally contain silicon, aluminum, oxygen, and an alkali or/and alkaline earth element, e.g., sodium and/or calcium, magnesium, etc. Analcite has the empirical formula $NaAlSi_2O_6 \cdot H_2O$ which on treatment with $Ca^{++}$ is converted, in subsequent dehydration, to the molecular sieve material $CaNa_2Al_2Si_4O_{12} \cdot 2H_2O$. In U.S. 2,442,191 a synthetic zeolite with molecular sieve properties having the empirical formula $4CaO \cdot Al_2O_3 \cdot 4SiO_2$ is described. Further description of these zeolites is found in the article "Molecular Sieve Action of Solids," Quarterly Reviews, vol. III, pp. 293–330 (1949), published by the Chemical Society (London).

The separation of normal from branch chain, cyclic, or aromatic compounds has become an increasingly important industrial problem. Thus, motor fuels containing substantial amounts of normal paraffins have low octane numbers. On the other hand segregation of certain straight chain components from their mixtures with branch chain isomers makes available preferred starting materials for many synthetic products, as straight chain olefins for manufacture of alkyl aryl sulfonate detergents, or as feed to the olefin carbonylation process.

The naturally occurring zeolites having molecular sieve properties do not occur abundantly in nature and are expensive. Efforts in the past have been made to supply this deficiency by synthesis of compositions having molecular sieve properties. Though the preparation of zeolites has long been known, only a few have structures and crystal lattice patterns allowing the molecular separations described above. Those synthetic products prepared hitherto having sieve properties also have not been altogether satisfactory, either because of the cost of the preparation, the specificity of the use, or the activity of the product.

In the past it has been proposed to make molecular sieves from silica gel and aluminum containing compounds such as the aluminates, or from water glass and sodium aluminate. Barrer (U.S. 2,413,134) describes the formation of gels by the interaction of water glass and sodium aluminate solutions. These gels are gradually converted into crystalline materials on heating in aqueous or alkaline suspensions for about 24 hours at 200° C. Such a process is of relatively little value commercially because of the long reaction period required to convert gels into crystals. In a commercial operation it is important to minimize reaction time and prepare material that may readily be processed. Gels, for instance, such as formed in this prior art operation, are difficult to filter.

A long step forward was taken when it was found that high yields of crystalline molecular sieves may be obtained practically instantaneously by controlled mixing under carefully controlled conditions in suitable proportions of certain forms of sodium silicate and sodium aluminate. The product obtained comprises a crystalline sodium alumino-silicate having uniform pores of a size suitable for admitting $C_3$ and lighter paraffins and olefins. These crystals may be modified in their adsorptive properties by replacing all or a part of the sodium by another cation, such as calcium; this can conveniently be accomplished by contact with the metal salt solution by base exchange.

It had been found, that in order to obtain substantially instantaneous production of crystals, it was essential to employ as one reactant a sodium silicate having a high ratio of soda to silica. The ratio is at least 0.8/1, and may be as high as 2/1. Preferably, however, the ratio is 1/1, and the desired reagent is sodium metasilicate. As pointed out, water glass or sodium silicates having lower $Na_2O/SiO_2$ ratios do not form the sieves unless subjected to extended heat soaking or crystallization periods.

The composition of the sodium aluminate is less critical than that of the sodium silicate. Sodium aluminates having any ratio of soda to alumina in the range of 1/1 to 3/1 may be employed; however, a sodium aluminate having a high ratio of soda to alumina is preferred, and a sodium aluminate having the ratio 1.5/1 $Na_2O/Al_2O_3$ is particularly desirable.

The amounts of sodium silicate solution and sodium aluminate solutions are such that the ratio of silica to alumina in the final mixture is in the range of 0.5/1 to 3/1, preferably in the range of 1/1–2.5/1, and particularly, about 2/1.

The method of mixing the sodium metasilicate and sodium aluminate solutions must be carried out in a manner allowing precipitation of a crystalline precipitate having a uniform composition. Rapid mixing of the sodium metasilicate and sodium aluminate solutions at temperatures in the range of about 160° F. to 215° F., particularly 180° F. to 212° F., results in substantially instantaneous precipitation of crystalline sodium alumino-silicate having the desired molecular sieve properties. Employing temperatures significantly below about 160° F. produces either a precipitate of amorphous sodium alumino-silicate having no sieve properties or a mixture of amorphous and crystalline sodium alumino-silicates having inferior sieve properties. There is no advantage in employing temperatures above about 215° F. since the reaction is substantially instantaneous at temperatures somewhat below 215° F. and the use of higher temperatures would require pressure equipment. A preferred method of mixing is to pass the two solutions simultaneously into a mixing zone provided with good agitation. The precipitated crystalline sieve forms almost immediately and may readily be filtered, dried, and activated by calcining.

The crystals obtained by this process, however, are characterized by a high degree of fragility and are obtained in very finely divided form, generally about 5–10 microns and smaller. Thus they are suitable for use in fixed bed operations when pelleted, but they are too weak for use in moving bed or fluidized solids operations. In the latter process, finely divided particles having a particle size of about 100–400 mesh are maintained in the form of a dense turbulent fluidized mass or bed by controlling the upward velocity of the adsorbing or desorbing gases within the range of 0.3+ to 5.0 feet per second. The fluidized bed technique, as described, for instance in U.S. 2,542,226, is highly desirable to use when contacting vapors with solids because of the ease of temperature control, lack of moving parts, and thorough contacting of gas and solid particles attainable. However, it is necessary to have a particle that is resistant to attrition and fracture, otherwise, non-fluidizable fines are formed, and fluidization is lost.

It is, therefore, the principal purpose of the present invention to set forth a process for preparing synthetic zeolites having outstanding adsorption characteristics for straight chain organic compounds and that are substantially harder and more attrition-resistant than any prepared hitherto.

It is a further object of the present invention to set forth a molecular sieve composition and a technique for its use as a fluidized solid.

Other and further objects and advantages of the present invention will appear from the following description, drawing and claims.

In accordance with one embodiment of the present invention, preformed complex of sodium alumino-silicate crystals, having molecular sieve properties and prepared in a manner described in more detail below, are treated with a sodium silicate solution and the composite slurry spray dried. After drying, the spheres are contacted with a calcium or other metal salt solution to convert the sodium alumino-silicate core material and the silicate coating simultaneously to the calcium or other metal form. The substitution of at least a part of the sodium for calcium results in increasing the sieve diameter from about 4 to about 5 Angstroms. Other metals may be group I metals such as copper, lithium or potassium; group II metals such as Mg, Ba, Sr, Zn, or Cd; group III, and the like. The resulting sieve is a hard attrition-resistant mass suitable for use in moving, slurry, or fluidized beds.

The process of the present invention may be more clearly understood when read in conjunction with the FIGURE, which is a diagrammatic representation of a preferred method of manufacturing the synthetic molecular sieves in accordance with the present invention. Turning now to the drawing, a solution of sodium metasilicate or disilicate is prepared in vessel 2 and of sodium aluminate in vessel 4. The concentration of the silicate may be in the range of about 30–300 grams of $SiO_3$ per liter, preferably in the range of about 100–200 grams per liter. The solution of aluminate has a concentration in the range of 40–400 grams $Al_2O_3$ per liter, preferably about 200–300 grams per liter. The amounts of metasilicate and aluminate solutions employed are such that the ratio of silica to alumina in the final mixture is in the range of 0.5/1–3/1, preferably 1/1–2.5/1. A ratio of about 2/1 is particularly desirable.

It is preferable to heat the two solutions separately prior to mixing, and vessels 2 and 4 may be provided with heating means, as may also mixing vessel 10. The two solutions are continuously passed simultaneously through lines 6 and 8 respectively into mixing zone 10. This vessel is provided with means for vigorous agitation, such as stirrer 12, and the temperature is maintained in the zone at from about 180–215° F. The sieve precipitates immediately on contact of the solution, particularly if a seed crystal of the desired sieve material is present, and the mixture is passed via line 14 to washing and filtration zone 16. Because of the rapidity of the sieve formation and precipitation, hold-up time in vessel 10 may be only about 15 minutes or less. In place of mixing vessel 10 a two-fluid mixing nozzle may be employed in which case the holding time in the mixing zone may be in the order of a second or less. Other means of rapidly mixing the solutions may be employed. The precipitated sodium-alumino-silicate sieve is water-washed and, recovered as such, although it may be base-exchanged with an alkaline earth metal preferably calcium, to form the corresponding calcium-sodium aluminosilicate. The latter is characterized by having pore diameters somewhat larger than the pore diameters of the sodium aluminosilicate. The calcium aluminosilicate or calcium sodium aluminosilicate produced by base exchanging the sodium aluminosilicate with a calcium salt solution has pores sufficiently large to admit straight chain paraffin and olefin hydrocarbons boiling in the gasoline boiling range; however, the pores of the calcium aluminosilicate are not large enough to admit branched chain or ring compounds. The calcium aluminosilicate is, therefore, generally more useful for petroleum processing than the sodium aluminosilicate.

In accordance with the present invention, the sodium alumino silicate sieve is preferably base exchanged with calcium ion concomitant with making the material attrition-resistant. The washed sodium sieve filter cake is withdrawn from zone 16 via line 20 and passed to mixing zone 22 wherein it is slurried with a solution of sodium silicate, such as sodium ortho-silicate "N-brand" ($Na_2O.3.25SiO_2.XH_2O$) or other form of sodium silicate. The amount of added silicate is such as to be about 3–50% $SiO_2$ based on the amount of solid adsorbent added. A preferred range is about 5–20% $SiO_2$ added as sodium silicate.

The slurry formed in mixer 22 is then passed via line 23 to drying zone 24 wherein it is preferably spray dried. The dried pellets or spheres resulting from the drying procedure were thereafter passed to ion exchange zone 26. An aqueous solution of salt, here calcium chloride, is passed via line 28 from storage vessel 30 to zone 26, which is also supplied with agitation and heat input means. The concentration of the calcium brine may be from about 2% to 25%. The product is preferably vigorously agitated to convert the sodium sieve to the calcium form and also the silicate coating to the calcium or other metal form.

Thereafter, after a contact time of from 5 minutes to several hours or longer, at temperatures ranging from ambient to about 200° F., the sieve is withdrawn through line 32, filtered and washed in zone 34, and then dried and activated in calcination zone 36. The temperature of activation may be in the range of from about 400°–1000° F., preferably about 700°–900° F.

The exchange reaction may be carried out in several stages if desired using a column contacting technique, counter-current flows, or other known methods of carrying out base exchange reactions. If desired, very dilute solutions of calcium salt, for example 0.01 to 0.1 molar, may be employed for the base exchange reaction; however, it is preferred to use more concentrated solutions, for example, in the range of about 0.5 to 2.5 molar. A solution of calcium chloride having a concentration in the range of about 5 to 20 percent by weight is particularly preferred. In the exchange reaction it is unnecessary to replace all of the sodium with calcium in order to obtain the desired adsorptive properties. It has been found that replacement of sodium by calcium beyond about 50% results in only slight improvement in the adsorptive capacity of the sieve for normal paraffins. It is preferred, therefore, to carry out the replacement of sodium by calcium to the extent of only about 50 to 70%.

The process of the present invention may be modified in various ways, providing the critical features of the high ratio soda/silica content of the sodium silicate, and the reaction temperature are maintained. Thus base exchanging may be carried out by treating the wet precipitate in the filter with a salt solution, or by reslurrying the precipitate in a salt solution. Besides sodium, other alkali aluminates and metasilicates such as potassium, lithium and the like may be employed. Similarly other water soluble salts may be employed in the base exchange reaction in place of calcium salts. For example, salts of potassium, lithium, strontium, magnesium, zinc, cadmium, and the like may be employed.

Under certain conditions it may be desirable to employ the sieves as pellets in fixed bed and moving bed operations. As has been previously pointed out, the normal crystalline material is exceptionally finely divided and fragile, the average size of the crystal being 5–10 microns or less. If the crystal is broken, as by crushing or otherwise, adsorbate molecules may reach the inner regions of the crystal without going through the uniform size pore opening in the crystal faces. When this happens, the crystal no longer behaves like a molecular sieve and the selectivity of the material is lost. Therefore, when it is desired to employ the crystals as pellets, they may be intimately mixed with sodium silicate and small amounts of water, composited into a uniform paste and extruded into pellets at relatively low pressures.

As distinct from the method of synthesizing the zeolite for the extrusion step, the sodium silicate employed may be any commercially available type, such as the orthosilicate, sesqui-silicate, meta silicate, di-silicate, or "N-brand" ($Na_2O.3.25SiO_2$), although it may be preferred to use the "N-brand" because of its relatively lower cost and high silica to soda ratio. Sufficient sodium silicate is mixed with the preformed crystalline alumino-silicate in such amount as to be less than about 25% (dry basis) of the composite, preferably about 5–20%. Water is added as needed to convert the composite into a suitable paste. After extrusion the pellets are dried and calcined. The strength of the pellets is materially improved, making them suitable for fixed bed operation, and the adsorptive capacity is very little affected, if at all.

Because the calcium form of the sieve is useful for removing n-paraffins and olefins from hydrocarbon feed streams, it may be advantageous to treat the pellets with a calcium salt solution, such as $CaCl_2$, and base exchange the sodium ions from the sieve structure to make the calcium form of the sieve while at the same time forming a calcium silicate bonding material to further increase the pellet strength. If desired, the calcium form of these alumino-silicates may be employed in the initial compositing operation with the sodium silicate and water to form the extrudable paste. Potassium silicates may also be substituted if desired. It is preferred, however, to composite the sodium form sieve with the sodium silicate, extrude or spray dry, and then effect base exchange with $CaCl_2$ or other metal salt solution. This procedure employs fewer handling steps and ensures a uniform quality product.

The process of the present invention may be further illustrated by the following specific examples illustrating the high attrition resistance shown by sieves prepared in accordance therewith.

*Example 1*

Twenty five pounds of sodium metasilicate (28.7% $SiO_2$) were dissolved in 90 pounds of water. In a separate vessel 30.5 pounds of a sodium aluminate stock solution (20% $Al_2O_3$; 12% $Na_2O$) were diluted with 27 pounds $H_2O$.

A 55 gallon drum was charged with about 10 gallons of water, heated to about 205° F. and the metasilicate and sodium aluminate solutions were simultaneously added in the proportion of about 2 volumes metasilicate per volume of aluminate. Vigorous stirring was used and heat continuously applied so that the temperature of the reaction vessel never was lower than 200° F. The mixture was allowed to cool, filtered and washed with water. The resulting filter cake was divided into 2 fractions. One fraction was oven dried and converted to the calcium form as follows: 100 grams of the dry sieve was treated with 1 liter of a 20% $CaCl_2$ solution with stirring for 4 hours. The material was then filtered, washed, oven dried at 250° F. and calcined 4 hours at 850° F. This material is designated "A." A second fraction of the original filter cake was treated as follows: 16.2 lbs. of the filter cake were slurried with about 110 lbs. $H_2O$. In a separate vessel, 7.7 liters of N-brand sodium silicate (405 gr. $SiO_2$/liter) were diluted to 115 lbs. with $H_2O$ and added to the sodium alumino silicate slurry with good stirring. The resulting slurry comprised about 10% solids. This slurry was spray dried. About 100 grams of the dried product was treated with 1 liter of a 20% $CaCl_2$ solution for 4 hours with good stirring to form the corresponding calcium salt forms, filtered, washed, oven dried at 250° F. and calcined 4 hours at 850° F. This material comprises a calcium aluminosilicate zeolite encased in calcium silicate comprising about 39% added $SiO_2$ (based on sieve) and is designated material "B."

*Example 2*

Samples of "A" and "B" prepared as described in Example 1 above were subjected to standard attrition rate tests and to cascade particle size determinations. The results are as follows:

| | A | B |
|---|---|---|
| Attrition rate, percent/hour | Over 85 | 5.1 |
| Particle Size Distribution: | | |
| Percent 0–20 microns | 41 | 2 |
| Percent 20–80 microns | 59 | 61 |
| Percent 80+ microns | 0 | 37 |

These data show that by the method of the present invention molecular sieve adsorbents can be made in an attrition resistant form and in a particle size range suitable for fluidized solids operation.

*Example 3*

A portion of the sodium alumino silicate filter cake prepared as described in Example 1 and weighing 100 grams (dry basis) was composited with a mixture comprising 75 cc. water and 25 cc. "N-brand" sodium silicate solution (405 grams $SiO_2$/liter). The mixture was oven dried at about 250° F. About 100 grams of the dried product was treated with 1 liter of a 20% $CaCl_2$ solution for about 4 hours, filtered, washed, oven dried at 250° F. and calcined 4 hours at 850° F. This material comprises a calcium alumino silicate molecular sieve encased in calcium silicate comprising about 10% added $SiO_2$ (based on sieve) and is designated material "C."

A portion of material "C" was mechanically ground to pass a 60 mesh screen. The ground powder was subjected to a standard attrition rate test and gave an attrition rate of 10.8% per hour. This compares very favorably with the value of greater than 85% per hour for the uncoated material "A." It is believed that the mechanical grinding to which material "C" was subjected produced irregular shaped particles which attrite at a faster rate than if the composite had been spray dried as for material "B" in Example 1.

*Example 4*

Samples of "A" and "C" prepared as described above in Examples 1 and 3, respectively, were tested for their adsorptive properties with n-heptane. Each sample was placed in a thermostat at the normal boiling point of n-heptane (210° F.). Successive increments of n-heptane were added to the adsorbents until they were saturated. The results were as follows:

|  | A | C |
| --- | --- | --- |
| Percent Added SiO₂ (non-adsorbent) | None | 10 |
| Capacity, cc. n-C₇H₁₆/g. material | 0.19 | 0.17 |
| Capacity, cc. n-C₇H₁₆/g. sieve | 0.19 | 0.19 |

These data show that by the method of the present invention molecular sieve adsorbents can be made in an attrition resistant form with no loss in adsorptive capacity based on actual sieve content.

*Example 5*

One hundred grams of the dried sodium alumino silicate prepared as described in Example 1 was composited with 36 cc. of water and 62 cc. of "N-brand" sodium silicate solution (405 gr. SiO₂/liter). The resultant paste was formed into ¼ inch balls, oven dried at 250° F. and calcined for 12 hours at 850° F. The composite comprised 75% sodium alumino silicate molecular sieves and 25% inert sodium silicate. The calcined balls had a crushing strength of 35 pounds. The composite was base exchanged to the calcium form by treating with one liter of a 20% CaCl₂ solution for 4 hours. The product was filtered, washed, dried at 250° F. and calcined 4 hours at 850° F. This material had an adsorptive capacity for n-heptane of 0.07 cc./gram. As pellets having strengths as little as 11–12 pounds are suitable for use in fixed bed and moving bed operation, it can be seen that by the method of this invention molecular sieve adsorbents can be made in a suitable form for fixed bed, moving bed or fluidized solids operation.

It is to be understood that the present invention may be applied to all zeolites having molecular sieve properties. Thus the molecular sieves having pores of 4 Angstroms in diameter are prepared as described in Example 1; the sodium form in base exchange with calcium forms the 5 Angstrom composition. Changing the ratio of reactants so that the ratio of SiO₂ to Al₂O₃ in the original reaction mixture is greater than about 3/1, and preferably about 6–10/1, favors the production of a zeolite having pore diameter of 13 Angstroms which, in base exchange with the calcium ion, forms a sieve having a 10 Angstrom pore size.

What is claimed is:

1. An improved process for preparing zeolites of superior strength having molecular sieve properties which comprises mixing sodium aluminate and sodium silicate in aqueous solution in amounts such that the ratio of silica to alumina in the mixture is in the range of about 0.5/1 to 3/1 at temperatures of from about 160° to about 215° F. precipitating crystalline sodium alumino silicate, segregating said crystals, treating said crystals with sodium silicate in the presence of water, drying said treated crystals, further treating said dried crystals with an aqueous solution of a calcium salt to replace at least a portion of the sodium content thereof, and activating said treated material.

2. An improved process for preparing superior zeolites having molecular sieve properties which comprises mixing an aqueous solution of sodium metasilicate and sodium aluminate at temperatures of from about 160° to about 215° F. in proportions such that the ratio of SiO₂/Al₂O₃ is in the range of about 1/1 to 2.5/1, precipitating a crystalline sodium alumino silicate, withdrawing said crystalline precipitate, slurrying said crystals with an aqueous solution of sodium silicate, spray drying said slurry, treating said spray dried material with an aqueous solution of an alkaline earth salt, calcining said treated material and recovering an attrition resistant zeolite of high adsorptive properties.

3. The process of claim 2 wherein said salt is a calcium salt.

4. An improved process for preparing superior zeolites having molecular sieve properties which comprises mixing an aqueous solution of sodium metasilicate and sodium aluminate at temperatures of from about 160° to about 215° F. in proportions such that the ratio of SiO₂/Al₂O₃ is in the range of about 1/1 to 2.5/1, precipitating a crystalline sodium alumino silicate, segregating said precipitate, mixing said precipitate with an aqueous solution of sodium silicate in proportions to make a paste, extruding said paste, treating said extruded paste with an aqueous solution of an alkaline earth salt, and calcining said extruded product.

5. The process of claim 4 wherein said salt is a calcium salt.

6. The process of claim 4 wherein said sodium silicate composited with said crystals to make said paste is less than about 25% of the composite.

References Cited in the file of this patent

UNITED STATES PATENTS

| 1,928,123 | Bruce | Sept. 26, 1933 |
| 2,165,014 | Shoemaker | July 4, 1939 |
| 2,413,134 | Barrer | Dec. 24, 1946 |
| 2,442,191 | Black | May 25, 1948 |
| 2,456,072 | Marisic | Dec. 14, 1948 |
| 2,480,627 | Bodkin et al. | Aug. 30, 1949 |
| 2,559,152 | Grosse et al. | July 3, 1951 |